US010003278B2

(12) United States Patent
Hajimiri et al.

(10) Patent No.: US 10,003,278 B2
(45) Date of Patent: Jun. 19, 2018

(54) ACTIVE CMOS RECOVERY UNITS FOR WIRELESS POWER TRANSMISSION

(71) Applicant: California Institute of Technology, Pasadena, CA (US)

(72) Inventors: Seyed Ali Hajimiri, Pasadena, CA (US); Behrooz Abiri, Pasadena, CA (US); Florian Bohn, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 682 days.

(21) Appl. No.: 14/552,249

(22) Filed: Nov. 24, 2014

(65) Prior Publication Data

US 2015/0145350 A1 May 28, 2015

Related U.S. Application Data

(60) Provisional application No. 61/908,015, filed on Nov. 22, 2013.

(51) Int. Cl.
*H02M 7/217* (2006.01)
*H02J 17/00* (2006.01)
(Continued)

(52) U.S. Cl.
CPC ............. *H02M 7/217* (2013.01); *H02J 5/00* (2013.01); *H02J 17/00* (2013.01); *H02M 7/003* (2013.01);
(Continued)

(58) Field of Classification Search
CPC ................................. H02M 7/217; H02J 17/00
(Continued)

(56) References Cited

U.S. PATENT DOCUMENTS 1,119,732 A 5/1907 Tesla
5,400,037 A 3/1995 East
(Continued)

FOREIGN PATENT DOCUMENTS

CN 101162267 A 4/2008
CN 102089952 A 6/2011
(Continued)

OTHER PUBLICATIONS

Baarman, "Making Wireless Truly Wireless: The need for a universal Wireless Power Solution," Wireless Power Consortium, (Sep. 2009). [Retrieved from the Internet Jan. 9, 2017: <https://www.wirelesspowerconsortium.com/technology/making-wireless-truly-wireless.html>].
(Continued)

*Primary Examiner* — Joseph Chang
(74) *Attorney, Agent, or Firm* — Alston & Bird LLP

(57) ABSTRACT

A rectifying circuit includes, in part, first and second NMOS transistors, an impedance matching network, and an RF block circuit. The source and gate terminals of the first NMOS transistor respectively receive the ground potential and a biasing voltage. The second NMOS transistor has a gate terminal coupled to the drain terminal of the first NMOS transistor, a drain terminal coupled to the gate terminal of the first NMOS transistor, and a source terminal receiving the ground potential. The impedance matching network is disposed between the antenna and the drain terminals of the first and second NMOS transistors. The RF block circuit is coupled between the drain terminals of the first and second NMOS transistors and the output terminal of the rectifying circuit. The RF block circuit is adapted to prevent the RF signal from flowing into the output terminal of the rectifying circuit.

31 Claims, 5 Drawing Sheets

(51) Int. Cl.
*H02J 5/00* (2016.01)
*H02M 7/00* (2006.01)
*H02M 7/23* (2006.01)
*H02M 1/12* (2006.01)

(52) U.S. Cl.
CPC ........ *H02M 7/23* (2013.01); *H02M 2001/123* (2013.01)

(58) Field of Classification Search
USPC .......................................................... 307/149
See application file for complete search history.

(56) References Cited

U.S. PATENT DOCUMENTS

| | | | |
|---|---|---|---|
| 6,127,799 A | 10/2000 | Krishnan | |
| 6,184,651 B1 | 2/2001 | Fernandez et al. | |
| 6,664,770 B1 | 12/2003 | Bartels | |
| 6,967,462 B1 | 11/2005 | Landis | |
| 7,027,311 B2 | 4/2006 | Vanderelli et al. | |
| 8,284,055 B2 | 10/2012 | Butler et al. | |
| 9,030,161 B2 | 5/2015 | Lu et al. | |
| 9,124,125 B2 | 9/2015 | Leabman et al. | |
| 9,130,397 B2 | 9/2015 | Leabman et al. | |
| 9,130,602 B2 | 9/2015 | Cook et al. | |
| 9,173,178 B2 | 10/2015 | Chakraborty et al. | |
| 2002/0030527 A1 | 3/2002 | Hung et al. | |
| 2002/0090966 A1 | 7/2002 | Hansen et al. | |
| 2004/0266338 A1 | 12/2004 | Rowitch | |
| 2007/0178945 A1 | 8/2007 | Cook et al. | |
| 2007/0182367 A1 | 8/2007 | Partovi et al. | |
| 2008/0014897 A1 | 1/2008 | Cook et al. | |
| 2008/0309452 A1 | 12/2008 | Zeine | |
| 2009/0011734 A1 | 1/2009 | Mertens et al. | |
| 2009/0261779 A1 | 10/2009 | Zyren | |
| 2010/0033021 A1 | 2/2010 | Bennett | |
| 2010/0034238 A1 | 2/2010 | Bennett | |
| 2010/0048255 A1 | 2/2010 | Jojivet et al. | |
| 2010/0181961 A1 | 7/2010 | Novak et al. | |
| 2010/0208848 A1 | 8/2010 | Zhu et al. | |
| 2010/0214159 A1 | 8/2010 | Ookawa et al. | |
| 2010/0259447 A1 | 10/2010 | Crouch | |
| 2010/0277003 A1 | 11/2010 | Von Novak et al. | |
| 2010/0309078 A1 | 12/2010 | Rofougaran et al. | |
| 2011/0025133 A1 | 2/2011 | Sauerlaender et al. | |
| 2011/0050166 A1 | 3/2011 | Cook et al. | |
| 2011/0053500 A1 | 3/2011 | Menegoli et al. | |
| 2011/0124310 A1 | 5/2011 | Theilmann et al. | |
| 2011/0151789 A1 | 6/2011 | Viglione et al. | |
| 2011/0167291 A1 | 7/2011 | Liu et al. | |
| 2011/0181237 A1 | 7/2011 | Hamedi-Hagh et al. | |
| 2012/0091799 A1 | 4/2012 | Rofougaran et al. | |
| 2012/0126636 A1 | 5/2012 | Atsumi | |
| 2012/0294054 A1* | 11/2012 | Kim ........................ H02J 17/00 363/126 |
| 2012/0326660 A1 | 12/2012 | Lu et al. | |
| 2013/0210477 A1 | 8/2013 | Peter | |
| 2013/0343106 A1 | 12/2013 | Perreault et al. | |
| 2014/0008993 A1 | 1/2014 | Leabman | |
| 2014/0175893 A1 | 6/2014 | Sengupta et al. | |
| 2015/0015194 A1 | 1/2015 | Leabman et al. | |
| 2015/0130293 A1 | 5/2015 | Hajimiri et al. | |
| 2015/0144701 A1 | 5/2015 | Xian et al. | |
| 2015/0155739 A1 | 6/2015 | Walley et al. | |
| 2015/0372541 A1 | 12/2015 | Guo et al. | |
| 2016/0094091 A1 | 3/2016 | Shin et al. | |
| 2016/0134150 A1 | 5/2016 | Chen et al. | |
| 2016/0181873 A1 | 6/2016 | Mitcheson et al. | |
| 2016/0190872 A1 | 6/2016 | Bohn et al. | |
| 2017/0111073 A1 | 4/2017 | Hajimiri et al. | |
| 2017/0237469 A1 | 8/2017 | Taghivand | |

FOREIGN PATENT DOCUMENTS

| | | | |
|---|---|---|---|
| EP | 2858209 A1 | 4/2015 | |
| JP | 2013-005529 A | 1/2013 | |
| JP | 2008-245404 A | 10/2013 | |
| KR | 10-2011-0133242 A | 12/2011 | |
| KR | 10-2011-0135507 A | 12/2011 | |
| KR | 10-2012-0069496 A | 6/2012 | |
| WO | WO 2007/084716 A2 | 7/2007 | |
| WO | WO 2013/151259 A1 | 10/2013 | |
| WO | WO 2014/075103 A1 | 5/2014 | |
| WO | WO 2015/077726 A1 | 5/2015 | |
| WO | WO 2015/077730 A1 | 5/2015 | |
| WO | WO 2016/028939 A1 | 2/2016 | |
| WO | WO 2017/053631 A1 | 3/2017 | |

OTHER PUBLICATIONS

Dickinson, "Evaluation of a Microwave High Power Reception Conversion Array for Wireless Power Transmission," Tech. Memo. 33-41, Jet Propulsion Laboratory, California Institute of Technology, (Sep. 1, 1975). [Retrieved from the Internet Jan. 9, 2017: <https://ntrs.nasa.gov/archive/nasa/casi.ntrs.nasa.gov/19760004119.pdf>].

Dickinson, "Performance of a High-Power, 2.388-GHz Receiving Array in Wireless Power Transmission Over 1.54 km," Microwave Symposium, 1976, IEEE-MTT-S International, pp. 139-141, IEEE, (1976).

Hirai, et al., "Practical Study on Wireless Transmission of Power and Information for Autonomous Decentralized Manufacturing System," IEEE Transactions on Industrial Electronics, 46(2):349-359, (1999).

Karalis, et al., "Efficient wireless non-radiative mid-range energy transfer," Annals of Physics, 323(2008):34-38, (2008).

Kurs, et al., "Wireless Power Transfer via Strongly Coupled Magnetic Resonances," Science, 371(83):83-86, (2007).

Tong, "A Novel Differential Microstrip Patch Antenna and Array at 79 GHz,", Proc. Int. Antennas Propag. Symp., pp. 279-280, (2008). [Retrieved from the Internet Jan. 9, 2017: <https://www.researchgate.net/profile/Christoph_Wagner4/publication/228992601_A_novel_differential_microstrip_patch_antenna_and_array_at_79_GHz/links/00b4952930cb62e535000000.pdf>].

Whitesides, "Researchers Beam 'Space' Solar Power in Hawaii," Wired Magazine, (Sep. 12, 2008). [Retrieved from the Internet Jan. 10, 2017: <https://www.wired.com/2008/09/visionary-beams/>].

EP Supplementary European Search Report for application 13854148 dated Jun. 20, 2016.

PCT International Search Report and Written Opinion of the International Searching Authority for application PCT/US2015/045969 dated Oct. 23, 2015.

U.S. Appl. No. 14/078,489, Response to Non-Final Office Action filed Nov. 8, 2016.

PCT International Preliminary Report on Patentability for application PCT/US2015/045969 dated Feb. 21, 2017.

U.S. Appl. No. 14/078,489, Final Office Action dated Feb. 24, 2017.

U.S. Appl. No. 14/552,414, Non-Final Office Action dated Mar. 24, 2017.

EPO Application No. EP14863210, Supplementary European Search Report dated May 16, 2017.

PCT International Preliminary Report on Patentability for application PCT/US2013/069757 dated May 12, 2015.

PCT International Preliminary Report on Patentability for application PCT/US2014/067175 dated May 24, 2016.

PCT International Preliminary Report on Patentability for application PCT/US2014/067187 dated May 24, 2016.

PCT International Search Report and Written Opinion of the International Searching Authority for application PCT/US2013/069757 dated Feb. 25, 2014.

PCT International Search Report and Written Opinion of the International Searching Authority for application PCT/US2014/067175 dated Mar. 16, 2015.

PCT Interntional Search Report and Written Opinion of the International Searching Authority for application PCT/US2014/067187 dated Mar. 16, 2015.

U.S. Appl. No. 14/078,489, Non-Final Office Action dated May 12, 2016.

(56) References Cited

OTHER PUBLICATIONS

PCT International Search Report and Written Opinion of the International Searching Authority for application PCT/US2016/053202 dated Dec. 9, 2016.
Kotani et al., "High-Efficiency Differential-Drive CMOS Rectifier for UHF RFIDs," IEEE Journal of Solid-State Circuits, 44(11):3011-3018, (2009).
Moon et al., "A 3.0-W Wireless Power Receiver Circuit with 75-% Overall Efficiency," IEEE Asian Solid State Circuits Conference (A-SSCC), pp. 97-100, Nov. 12, 2012.
EPO Application No. EP14863147, Supplementary European Search Report completed Jun. 30, 2017.
Zheng, "Introduction to Air-to-air missiles system," Weapon Industry Press, Beijing, pp. 94-95, Dec. 31, 1997.
U.S. Appl. No. 14/078,489, Non-Final Office Action dated Sep. 22, 2017.
U.S. Appl. No. 14/552,414, Final Office Action dated Oct. 26, 2017.
U.S. Appl. No. 14/552,414, Response to Non-Final Office Action filed Sep. 25, 2017.
U.S. Appl. No. 14/830,692, Non-Final Office Action dated Oct. 16, 2017.
U.S. Appl. No. 14/830,692, Requirement for Restriction/Election dated Jul. 6, 2017.
U.S. Appl. No. 14/830,692, Response to Requirement for Restriction/Election filed Aug. 15, 2017.

\* cited by examiner

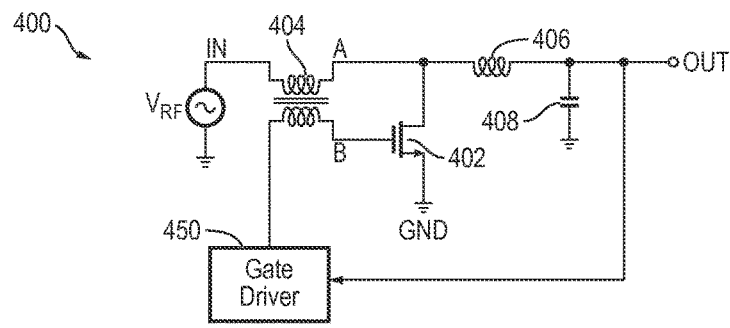
FIG. 6
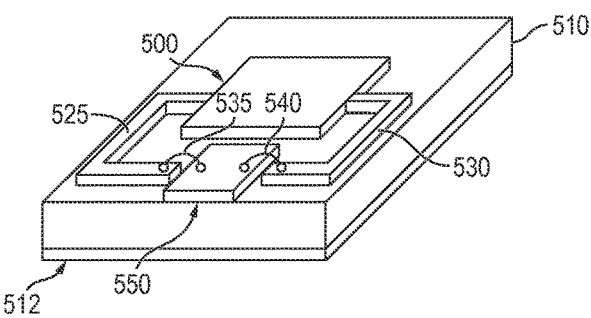
FIG. 7
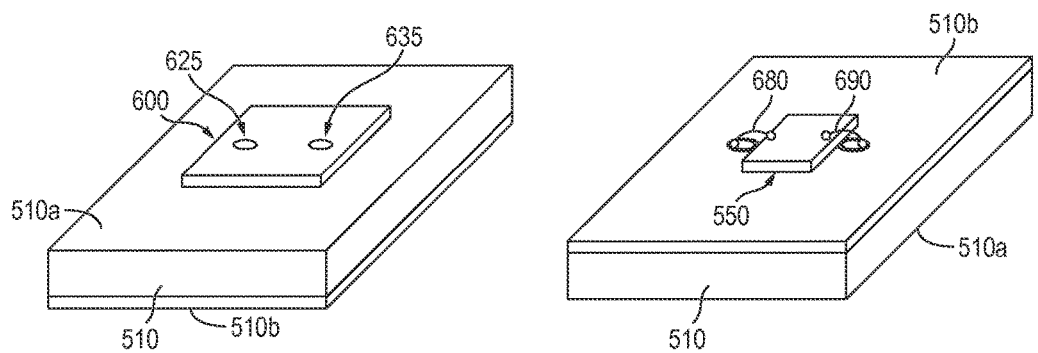
FIG. 8A
FIG. 8B

ACTIVE CMOS RECOVERY UNITS FOR WIRELESS POWER TRANSMISSION

CROSS-REFERENCES TO RELATED APPLICATIONS

The present application claims benefit under 35 USC 119 (e) of U.S. provisional Application No. 61/908,015, filed Nov. 22, 2013, entitled "ACTIVE CMOS RECOVERY UNITS FOR WIRELESS POWER TRANSMISSION", the content of which is incorporated herein by reference in its entirety.

BACKGROUND OF THE INVENTION

Advances in silicon processing have enabled integration of complex systems on a single low power chip. The low cost and low power consumption of such systems have resulted in proliferation of portable electronic devices. To operate, such devices must be frequently plugged into an electrical outlet to be charged.

Wireless power transmission may be achieved using inductive coupling or electromagnetic waves. Inductive coupling can deliver power over a short range. Electromagnetic (EM) waves may be used to transmit power over a longer distance. Both inductive coupling and EM waves cause an alternating current (AC) to be generated at the receiver. The AC current is subsequently converted to a direct current (DC). A higher frequency of operation may be used to reduce the size of a wireless power transmission recovery circuit. However, conventional diode rectifiers used in conventional electronic systems, such as power adapters and chargers, are not suited for operation at high frequencies.

FIG. 1 is a schematic diagram of a conventional rectifying circuit 10 adapted to convert an electromagnetic wave received via antenna 20 to a DC voltage across terminals OUT$^+$ and OUT$^-$. Circuit 10 is shown as including a matching LC network 12, a Schottky diode 14 and a RF bypass network 16. During one-half of each cycle when the anode terminal A of diode 14 has a higher potential than its cathode terminal B, diode 14 become conductive thus causing the received energy to be stored in electric and magnetic fields inside the matching network 12. During the other half of each cycle, diode 14 becomes non-conductive and the stored energy in matching network 12 as well as the incident energy are supplied across output terminals OUT$^+$ and OUT$^-$. Schottky diode 14 is required to operate in the GHz frequency range. While Schottky diode based rectifying circuits are efficient, they are not suitable for integration with CMOS technologies.

FIG. 2 is a schematic diagram of a conventional CMOS recovery circuit 50 driving load 72. Recovery circuit is shown as including NMOS transistors 52, 54, PMOS transistors 62, 64, and capacitor 70. Differential voltage $V_{RF}$, delivered via node $N_1$ by an antenna (not shown) receiving the incident EM wave is applied to the gate terminals of transistors 54, 64 and to source terminals of transistors 52, 62. Likewise, differential voltage $\overline{V_{RF}}$ delivered via node $N_2$ by the antenna is applied to the gate terminals of transistors 52, 62 and to source terminals of transistors 54, 64. During one half of each cycle when differential voltage $V_{RF}$ is at a high voltage relative to the differential voltage $\overline{V_{RF}}$, transistors 52 and 64 are off and transistors 54 and 62 are on, accordingly a current flows from drain terminal of transistor 54 (ground terminal GND) to node $N_2$, and from node $N_1$ to output node OUT of load 72. During the other half of each cycle when differential voltage $V_{RF}$ is at a low voltage relative to the differential voltage $\overline{V_{RF}}$, transistors 52 and 64 are on and transistors 54 and 62 are off, accordingly a current flows from ground terminal GND to node $N_1$, and from node $N_2$ to output node OUT. In other words, during both cycles, the current flows out of the ground terminal GND and into the output node OUT thus rectifying the current.

Recovery circuit 50 is efficient in low power applications (such as RFID), but is not suitable for use in charging portable consumer electronics that require a relatively high power rectification. A need continues to exist for a rectifying circuit that is efficient and is adaptive to handle relatively higher power.

BRIEF SUMMARY OF THE INVENTION

A rectifying circuit, in accordance with one embodiment of the present invention, is adapted to rectify an RF signal supplied by an antenna receiving electromagnetic waves. In one embodiment, the rectifying circuit includes, in part, first and second NMOS transistors, an impedance matching network, and an RF block circuit. The source and gate terminals of the first NMOS transistor respectively receive the ground potential and a biasing voltage. The second NMOS transistor has a gate terminal coupled to the drain terminal of the first NMOS transistor, a drain terminal coupled to the gate terminal of the first NMOS transistor, and a source terminal receiving the ground potential. The impedance matching network is disposed between the antenna and the drain terminals of the first and second NMOS transistors. The RF block circuit is coupled between the drain terminals of the first and second NMOS transistors and the output terminal of the rectifying circuit. The RF block circuit is adapted to prevent the flow of the RF signal to the output terminal of the rectifying circuit.

In one embodiment, the rectifying circuit further includes, a first capacitive element disposed between the gate terminal of the first NMOS transistor and the drain terminal of the second NMOS transistor, and a second capacitive element disposed between the gate terminal of the second NMOS transistor and the drain terminal of the first NMOS transistor. In one embodiment, the impedance matching network includes, in part, a first inductive element coupled between the output terminal and the drain terminal of the first NMOS transistor, and a second inductive element coupled between the output terminal and the drain terminal of the second NMOS transistor.

In one embodiment, the RF block circuit includes, in part, a capacitive element disposed between the output terminal and a ground terminal supplying the ground potential. In one embodiment, the rectifying circuit further includes, in part, a biasing circuit supplying the biasing voltage to the gate terminals of the first and second NMOS transistors. In one embodiment, the biasing circuit is a battery. In one embodiment, the biasing circuit supplies the biasing voltage in response to an output voltage the biasing circuit senses at the output terminal of the rectifying circuit.

In one embodiment, the rectifying circuit further includes, in part, a first resistive element disposed between the biasing circuit and the gate terminal of the first NMOS transistor; and a second resistive element disposed between the biasing circuit and the gate terminal of the second NMOS transistor. In one embodiment the first and second NMOS transistors are enhancement mode transistors. In another embodiment the first and second NMOS transistors are depletion mode transistors. In one embodiment, the RF signal is applied between the drain terminals of the first and second NMOS transistors. In another embodiment, the RF signal is applied between the drain terminal of the first NMOS transistor and the ground terminal. In one embodiment, the rectifying circuit further includes, in part, a first inductive element disposed between the biasing circuit and the gate terminal of the first NMOS transistor, and a second inductive element disposed between the biasing circuit and the gate terminal of the second NMOS transistor.

A rectifying circuit, in accordance with another embodiment of the present invention, includes, in part, an NMOS transistor, an impedance matching network, an RF block circuit, and a gate driver circuit. The NMOS transistor has a source terminal receiving the ground potential. The impedance matching network is disposed between the antenna and the drain terminal of the NMOS transistor. The RF block circuit is coupled between the drain terminal of the NMOS transistor and the output terminal of the rectifying circuit. The gate driver circuit is adapted to drive the gate terminal of the NMOS transistor in response to the output of the rectifying circuit.

In one embodiment, the impedance matching network includes, in part, a portion of a transformer having a first output terminal coupled to the drain terminal of the NMOS transistor and a second output terminal coupled to the gate terminal of the NMOS transistor. The first and second output terminals of the transformer supply signals that are 180° out-of-phase with respect to one another. In one embodiment, the RF block circuit includes, in part, an inductive element disposed between the drain terminal of the NMOS transistor and the output terminal of the rectifying circuit, and a capacitive element disposed between the output terminal of the rectifying circuit and the ground terminal. In one embodiment, the gate driver circuit drives the gate terminal of the NMOS transistor via a second input terminal of the transformer.

A method of rectifying an RF signal delivered by an antenna, in accordance with one embodiment of the present invention, includes, in part, applying a biasing voltage to a gate terminal of a first NMOS transistor having a source terminal receiving the ground potential, applying the biasing voltage to a gate terminal of a second NMOS transistor having a gate terminal coupled to the drain terminal of the first NMOS transistor, a drain terminal coupled to the gate terminal of the first NMOS transistor, and a source terminal receiving the ground potential. The method further includes matching an impedance of the antenna to an impedance of the drain terminals of the first and second NMOS transistor, and blocking the RF signal from arriving at an output terminal carrying the rectified signal.

In one embodiment, the method further includes, in part, applying the biasing voltage to the gate terminal of the first NMOS transistor via a first capacitive element, and applying the biasing voltage to the gate terminal of the second NMOS transistor via a second capacitive element. In one embodiment, the impedance matching is achieved using a first inductive element coupled between the output terminal and the drain terminal of the first NMOS transistor, and a second inductive element coupled between the output terminal and the drain terminal of the second NMOS transistor.

In one embodiment, the RF signal is blocked via a capacitive element disposed between the output terminal and a ground terminal supplying the ground potential. In one embodiment, the method further includes supplying the biasing voltage via a battery. In one embodiment, the biasing voltage is supplied in response to the voltage of the output terminal. In one embodiment, the method further includes, in part, supplying the biasing voltage to the gate terminal of the first NMOS transistor via a first resistive element, and supplying the biasing voltage to the gate terminal of the second NMOS transistor via a second resistive element.

In one embodiment, the first and second NMOS transistors are enhancement mode transistors. In another embodiment, the first and second NMOS transistors are depletion mode transistors. In one embodiment, the method further includes, in part, applying the RF signal between the drain terminals of the first and second NMOS transistors. In another embodiment, the method further includes, in part, applying the RF signal between the drain terminal of the first transistor NMOS transistor and a ground terminal supplying the ground potential. In one embodiment, the method further includes, in part, supplying the biasing voltage to the gate terminal of the first NMOS transistor via a first inductive element, and supplying the biasing voltage to the gate terminal of the second NMOS transistor via a second inductive element.

A method of rectifying an RF signal delivered by an antenna, in accordance with one embodiment of the present invention, includes, in part, driving a gate terminal of an NMOS transistor in response to the rectified signal, applying a ground potential to a source terminal of the NMOS transistor, matching an impedance of the antenna to an impedance of the drain terminal of the NMOS transistor, and blocking the RF signal from reaching the output terminal carrying the rectified signal.

In one embodiment, the impedance matching is achieved using a matching network that includes, in part, a portion of a transformer having a first output terminal coupled to the drain terminal of the NMOS transistor and a second output terminal coupled to the gate terminal of the NMOS transistor. The first and second output terminals of the transformer supply signals that are 180° out-of-phase with respect to one another. In one embodiment, the method further includes, in part, blocking the RF signal via an inductive element disposed between the drain terminal of the first NMOS transistor and the output terminal, and a capacitive element disposed between the output terminal and a ground terminal supplying the ground potential. In one embodiment, the gate terminal of the NMOS transistor is driven via a second input terminal of the transformer.

BRIEF DESCRIPTION OF THE DRAWINGS

FIG. 6 is a schematic diagram of a differential rectifying circuit adapted to convert an electromagnetic wave to a DC voltage, in accordance with one embodiment of the present invention.

FIG. 7 is a perspective view of an antenna supplying RF power to a rectifying circuit 550, in accordance with one embodiment of the present invention.

FIGS. 8A and 8B show opposing sides of a board having mounted thereon an antenna and a rectifying circuit, in accordance with one embodiment of the present invention.

DETAILED DESCRIPTION OF THE INVENTION

Figure 1:
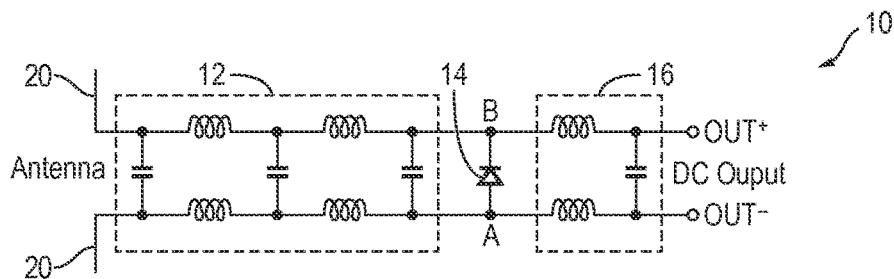
FIG. 1 is a schematic diagram of a rectifying circuit adapted to convert an electromagnetic wave to a DC voltage, as known in the prior art.
Figure 2:
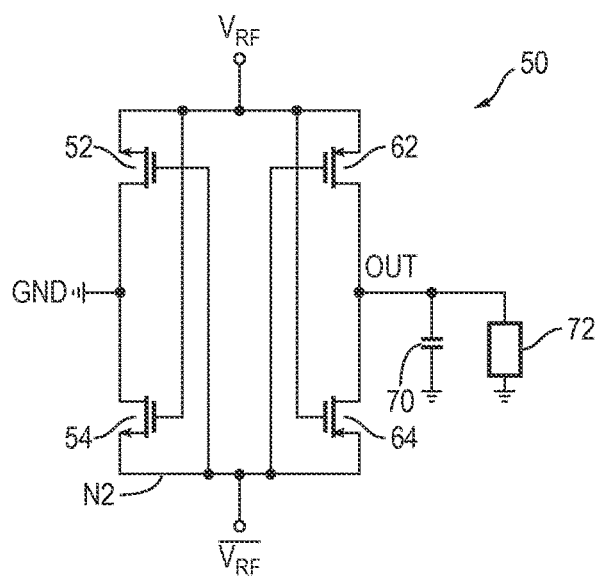
FIG. 2 is a schematic diagram of a rectifying circuit adapted to convert an electromagnetic wave to a DC voltage, as known in the prior art.
Figure 3:
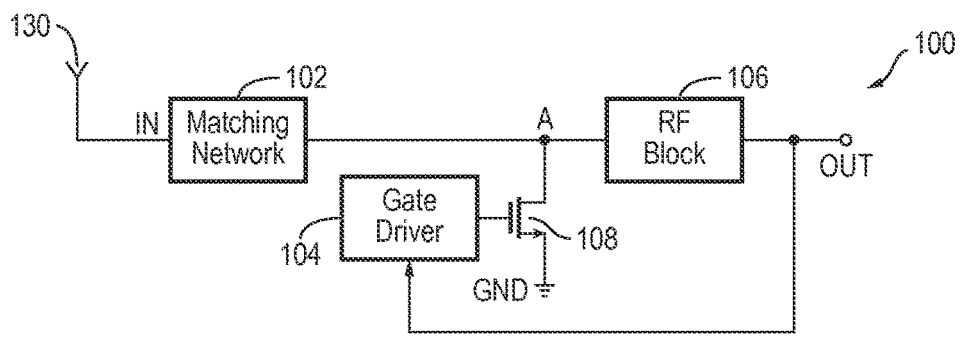
FIG. 3 is a schematic diagram of a rectifying circuit adapted to convert an electromagnetic wave to a DC voltage, in accordance with one embodiment of the present invention.

FIG. 3 is a schematic diagram of a CMOS rectifying circuit 100, in accordance with one embodiment of the present invention. CMOS rectifying circuit 100 is shown as including, in part, a matching network 102, a gate driver (gate driving circuit) 104, an RF blocker (blocking circuit) 106, and an N-channel MOS (NMOS) transistor 108. Antenna 130 receives the incident electromagnetic (EM) wave and applies the received RF signal via input terminal IN to circuit 100.

Matching network 102 is adapted to provide impedance matching between the antenna and the drain node A of transistor 108. It is understood that any number of matching networks may be used to provide such impedance matching. RF blocker 106 is adapted to block the received RF signal from reaching the output terminal OUT. It is understood that any number of RF blocking circuits may be used to inhibit the RF signal from arriving at the output terminal OUT. Gate driver 104 is adapted to sense the output voltage present at output terminal OUT and in response control the DC and AC components of the voltage applied to the gate of NMOS transistor 108 dynamically to achieve optimum operating performance metrics, such as efficiency, output voltage, load, and the like.

During one-half of each cycle when the voltage supplied at input terminal IN is positive relative to the ground potential (received by the source terminal of transistor 108) because transistor 108 is on, the current delivered to node A by matching network 102 flows to the ground GND. During the other half of each cycle, when the voltage supplied at input terminal IN is negative relative to the ground potential, a DC current is enable to flow from the ground terminal GND to output terminal OUT via node A and RF blocking circuit 106. The voltage at terminal OUT is therefore rectified.

Figure 4:
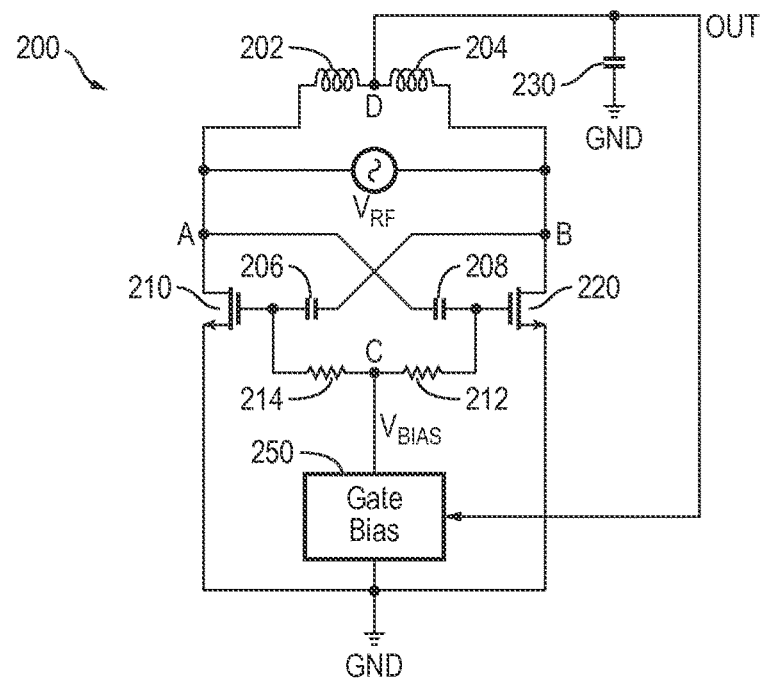
FIG. 4 is a schematic diagram of a differential rectifying circuit adapted to convert an electromagnetic wave to a DC voltage, in accordance with one embodiment of the present invention.

FIG. 4 is a schematic diagram of a rectifying circuit 400 adapted to rectify RF voltage $V_{RF}$ supplied by an antenna (not shown) in response to incident electromagnetic waves, in accordance with one embodiment of the present invention. Rectifying circuit 200 is shown as including, in part, inductors 202, 204, capacitors 206, 208, 230, resistors 214, 212, NMOS transistors 210, 220, and optional gate driver circuit 250.

Inductors 202, 204 form a matching network in the differential mode between drain terminals (i.e., nodes A and B) of transistors 210, 220 and the antenna ports (not shown) supplying differential RF signal $V_{RF}$ to nodes A and B. Inductors 202, 204 partly offset the parasitic capacitance of transistors 210, 220, and together with capacitor 230 form a low pass filter, thereby filtering out voltage ripples that would otherwise appear at the output terminal OUT.

During the common mode, inductors 202, 204 and capacitor 230 form an RF blocking circuit by causing the RF signal to be shunted to the ground terminal GND and thus blocking the RF signal from reaching the output terminal Out. In one embodiment gate driver circuit 250 may include a battery. In another embodiment, gate driver circuit 250 is adapted to sense the output voltage at terminal OUT and in response apply biasing voltage $V_{Bias}$ to the gate terminals of transistors 210, 220 via resistors 214, 212. Resistors 214 and 212 are selected to have relatively high resistances so as to cause relatively low voltage drop. Accordingly, the DC voltage supplied to the gate terminals of transistors 210, 220 is substantially similar to voltage $V_{Bias}$. Although not shown, it is understood that other embodiments of rectifying circuit 400 may use a first inductive element in place of resistors 212, and a second inductive element in place of resistor 214.

The DC voltage $V_{Bias}$ generated by gate driver circuit 250 is set to a value that places transistors 210 and 220 at the onset of conduction. During one-half of each cycle when node A has a higher voltage than node B (as supplied by the antenna), transistor 220 turns on and transistor 210 turns off. Conversely, during the other half of each cycle when node A has a lower voltage than node B, transistor 220 turns off and transistor 210 turns on. Capacitors 206 and 208 prevent the current supplied by gate driver 250 from flowing into nodes A and B.

As described above, during one-half of each cycle when node A has a higher voltage than node B, transistor 220 is turned on and transistor 210 turns off. Accordingly, during such cycles, current is caused to flow from the ground terminal GND to terminal OUT via transistor 220 and inductor 204. During the other half of each cycle when node A has a lower voltage that node B, transistor 210 is turned on and transistor 220 is turned off. Accordingly, during such cycles, current is caused to flow from the ground terminal GND to terminal OUT via transistor 210 and inductor 202. In one embodiment, NMOS transistors are enhancement mode transistors. In other embodiments, NMOS transistors are depletion-mode transistors.

As described above, gate driver circuit 250 is adapted to sense the output voltage at terminal OUT and in response vary the biasing voltage it applies to gate terminals of transistors 210, 220. This biasing voltage is varied until the voltage at terminal OUT reaches a predefined value. If the incident electromagnetic wave is relatively too strong, it may cause damage to transistors 210, 220. Intrinsic or extrinsic protection mechanisms may thus be used to improve the reliability and longevity of rectifying circuit 200. Such protection may be provided at different levels ranging from the top-level system, to various blocks and individual circuits. For example, in one embodiment, when the output voltage exceeds a predefined value, gate driver circuit 250 increases the voltage applied to the gate terminals of transistors 210, 220 to a maximum possible value to lower the resistances from nodes A/B to the ground, thereby to shut down the rectifying operation of rectifying circuit 200. The rectifying circuit may use wireless communication (not shown) to instruct the transmitter to lower its power.

Figure 5:
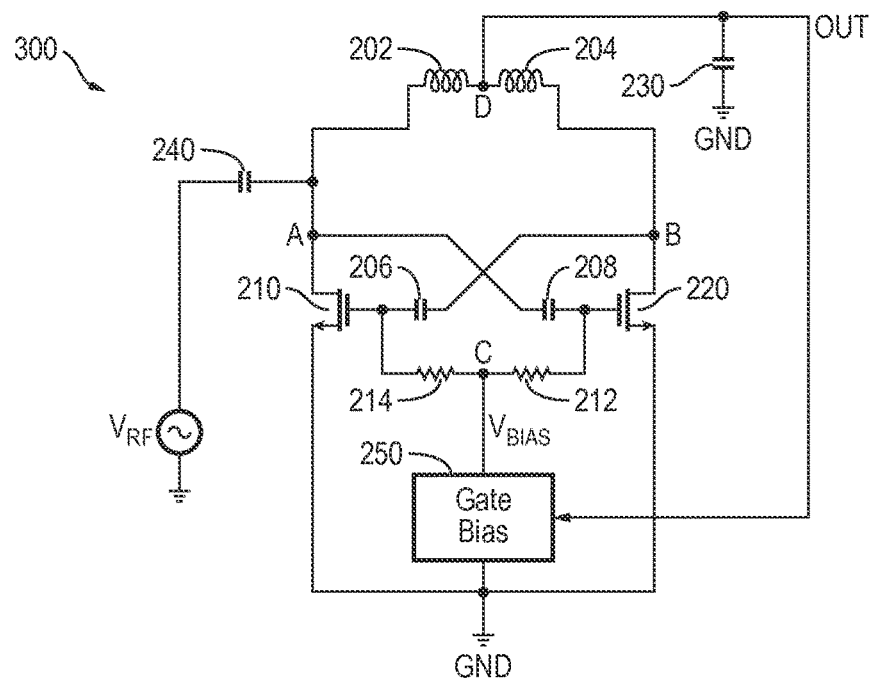
FIG. 5 is a schematic diagram of a differential rectifying circuit adapted to convert an electromagnetic wave to a DC voltage, in accordance with one embodiment of the present invention.

FIG. 5 is a schematic diagram of a differential rectifying circuit 300 adapted to rectify a received RF signal, in accordance with another embodiment of the present invention. Rectifying circuit 300 is similar to rectifying circuit 200 except that in rectifying circuit 300, voltage $V_{RF}$ is applied between the ground terminal GND and node A via capacitor 240. In the differential mode, rectifying circuit 300 provides a rectified voltage at terminal OUT in the same manner as described above in connection with rectifying circuit 200. The common mode of voltage signal $V_{RF}$ however is rejected by rectifying circuit 300.

FIG. 6 is a schematic diagram of a rectifying circuit 400 adapted to rectify RF voltage signal $V_{RF}$ supplied by an antenna (not shown), in accordance with another embodiment of the present invention. The antenna that provides the RF signal to rectifying circuit 400 is assumed to be single ended. Rectifying circuit 400 is shown, as including, in part, NMOS transistor 402, transformer (balun) 404, inductor 406, and capacitor 408. Rectifying circuit 400 is also shown as including, in part, an optional gate driver circuit 450 adapted to sense the output voltage present at the output terminal OUT and in response control the DC and AC components of the voltage applied voltage that places transistors 401 at the onset of conduction.

In response to input voltage $V_{RF}$, balun 404 supplies a pair of voltages at nodes A and B (i.e., output nodes or terminals of the transformer) that are 180° out-of phase. During one-half of each cycle when voltage $V_{RF}$ is negative with respect to the ground potential, output node B of balun 404—connected to the gate terminal of transistor 404— receives a positive voltage which together with the voltage supplied by gate driver circuit 450 causes transistor 402 to turn on. Since output node A of balun 404—connected to the drain terminal of transistor 402—also has a negative voltage, during such cycles a current flows from the ground terminal GND to transformer 404 via node A, thereby causing a magnetic field to build up in the transformer. During the other half of each cycle, when voltage $V_{RF}$ is positive with respect to the ground potential, the negative voltage delivered to node B by balun 404 causes transistor 402 to turn off. Accordingly, during such cycles, current flows from input terminal IN and transformer to output terminal OUT via inductor 406 thereby rectifying the received RF voltage.

FIG. 7 is a perspective view of an antenna 500, in accordance with one embodiment of the present invention, supplying RF power (received from EM waves incident on antenna 500) to a rectifying circuit 550, as described in accordance with any of the embodiments described above. Antenna 500 is shown as having a first port 525 positioned along a first side of and coupled to rectifying circuit 550 via conductor 535, and a second port 530 positioned along a second side of and coupled to rectifying circuit 500 via conductor 540. The lengths of ports 525 and 5530 is defined by one-half of the wavelength of the incident RF signal.

Antenna 500 and rectifying circuit 550 are mounted on a first side of dielectric layer 510. Ground plane 512 is positioned along the second side of dielectric 510 opposing the first side, as shown. Dielectric layer 510 may be a printed circuit board (PCB). Antenna 500 is planar with a compact profile and is mechanically robust in collecting the incident electromagnetic power. Although antenna 500 is shown as having two ports 525, 530 and generating a pair of differential signals via wire bonds 535 540, it is understood that an antenna, in accordance with embodiments of the present invention, may be single ended and provide, for example, both linear or circular polarization. Impedance matching between the antenna and the transistors disposed in the rectifying circuit (for example, transistors 210, 220 shown in FIG. 4) is achieved, in part, by varying the dimensions of wire bonds 535, and 540.

FIG. 8A is a perspective view of an antenna 600, in accordance with another embodiment of the present invention, and adapted to supply RF power in response to EM waves incident on the antenna 600. Antenna 600 is shown as being mounted on a first side 510a of dielectric layer 510. Antenna 600 is shown as including two vias 625 and 635. By adjusting the relative positions of the vias, the impedance of antenna 600 may be varied. For example, the closer the vias are to the center of antenna 600, the lower the impedance of the antenna becomes due to the null in the fundamental operation mode of the antenna. Mounted on the opposite side 510b of dielectric layer 510, as shown in FIG. 8B, is a rectifying circuit corresponding to any of the embodiments described above. Antenna 600 is coupled to rectifying circuit 550 through vias 625, 635 (which include conductive materials) and wire bonds 680, 690. To the extent that rectifying circuit 550 and wire bonds 6890, 690, whose dimensions may be varied to achieve impedance matching, are positioned on one side (i.e., 510a) of dielectric layer 510 and thus are isolated from antenna 600 which is positioned on the other side (i.e., 510b) of dielectric layer 510, antenna 600 has an enhanced robustness and is relatively less complex.

Figure 9A:
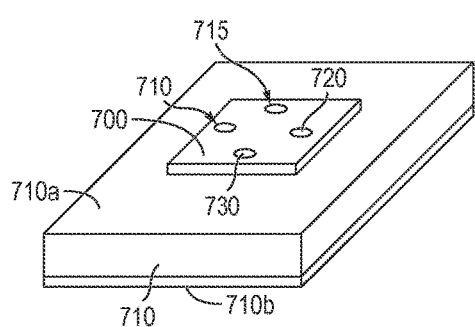
FIGS. 9A and 9B show opposing sides of a board having mounted thereon an antenna and a rectifying circuit, in accordance with another embodiment of the present invention.
Figure 9B:
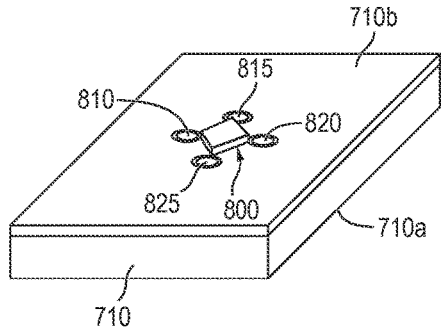

In accordance with another embodiments of the present invention, circularly polarized power transmission is achieved so as to account for changes in the orientation of portable handheld devices undergoing charging. FIG. 9A is a perspective view of an antenna 700, in accordance with another embodiment of the present invention, and adapted to supply RF power in response to EM waves incident on antenna 700. Antenna 700 is mounted on a first side 710a of dielectric layer 710 and is shown as including four vias 710, 715, 720 and 730. By adjusting the relative positions of the vias, the impedance of antenna 700 may be varied. Mounted on the opposite side 710b of dielectric layer 710, as shown in FIG. 9B, is a rectifying circuit 800 corresponding to any of the embodiments described above. Antenna 700 is coupled to rectifying circuit 550 through vias 710, 715, 720 and 730 (which include conductive materials) and wire bonds 810, 815, 820, and 825. Antenna 700 is adapted to recover power from EM waves polarized in different orientations. For example, when radiated with circularly polarized EM waves, antenna 700 generates two differential signals that are 90 degrees out of phase with respect to one other.

Figure 10A:
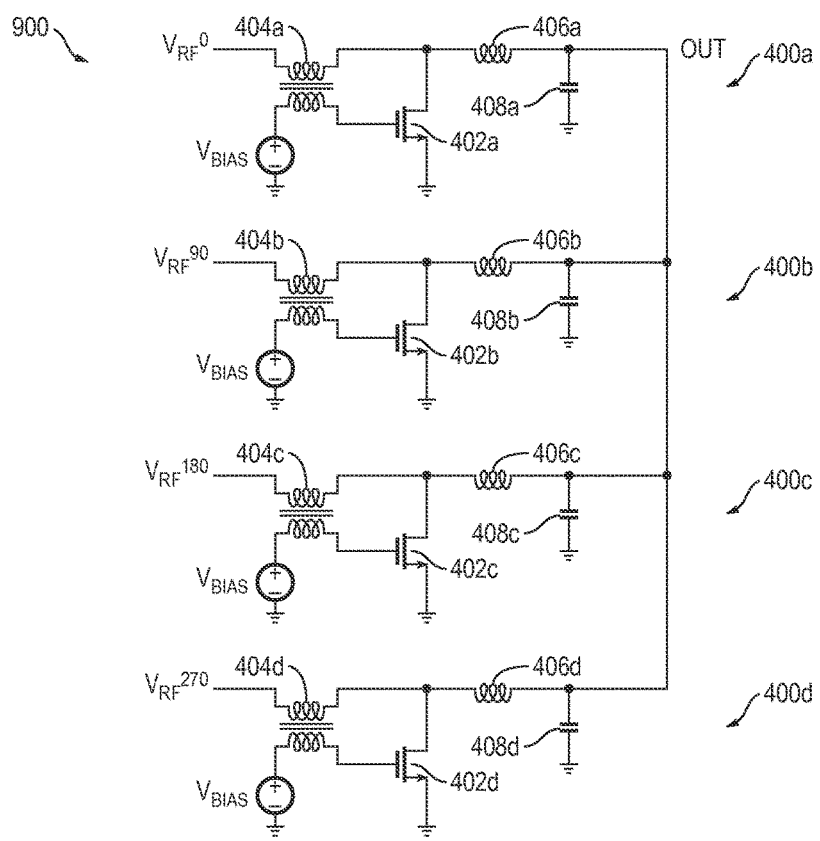
FIG. 10A is a schematic view of a rectifying circuit formed by coupling together a multitude of rectifying circuits each corresponding to the rectifying circuit shown in FIG. 6, in accordance with another embodiment of the present invention.

FIG. 10A is a schematic view of a rectifying circuit 900, in accordance with one embodiment of the present invention, formed by coupling together four rectifying circuit 400a, 400b, 400c, and 400d, each of which corresponds to rectifying circuit 400 shown in FIG. 6. Voltages $V_{RF}^{0}$, $V_{RF}^{90}$, $V_{RF}^{180}$ and $V_{RF}^{270}$ respectively applied to rectifying circuits 400b, 400c and 400d, have 90°, 180°, and 270° phase shift respectively relative to voltage $V_{RF}^{0}$ applied to rectifying circuit 400a. The outputs of the four rectifying circuits are coupled to one another.

Figure 10B:
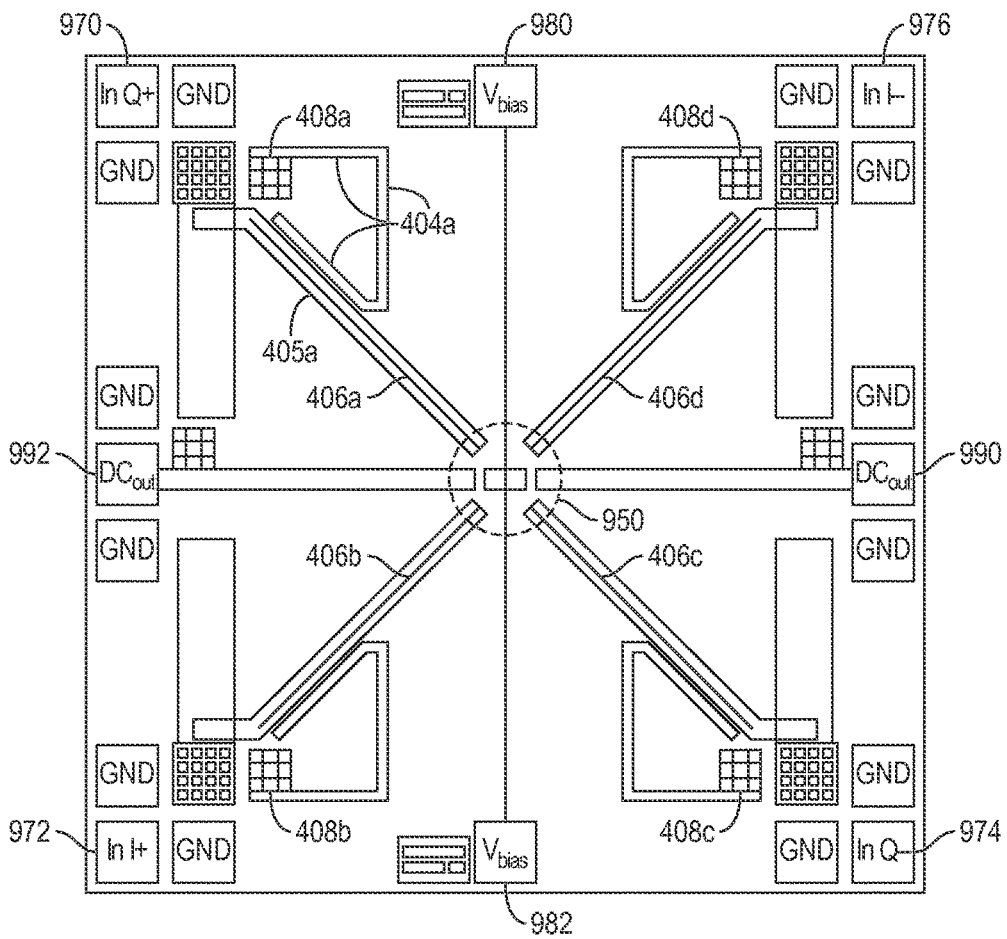
FIG. 10B is an exemplary layout view of the rectifying circuit shown in FIG. 10A, in accordance with another embodiment of the present invention.

FIG. 10B is a top view of a layout of rectifying circuit 900 shown in FIG. 10A. capacitors 408a, 408b, 408c and 408d are positioned near the four corners of the layout, as is shown. Inductors 406a, 406b, 406c and 406d are shown as being placed diagonally along opposite corners of the layout. A portion of each inductor positioned in the vicinity of an associated transformer forms the inductive element of the transformer. For example, inductive element 405a which is an extension of inductor 406a is a part of transformer 404a. Transistors 402a, 402b, 402c and 402d are positioned within the dashed perimeter line 950. Voltage signals $V_{RF}^0$, $V_{RF}^{90}$, $V_{RF}^{180}$ and $V_{RF}^{270}$ are respectively received from an antenna disposed on an opposite side of the board (as shown in FIGS. 9A and 9B) and are respectively delivered to pads 970, 972, 974 and 976 positioned near the four corners of the layout. The voltage supplied by the gate driver circuit (not shown in FIG. 10B) and used to bias the transistors are supplied by pads 980, 982. The output voltage of the rectifying circuit is supplied via pads 980, 982. Each rectifying circuit may generate a fraction of the total required DC power.

Figure 11A:
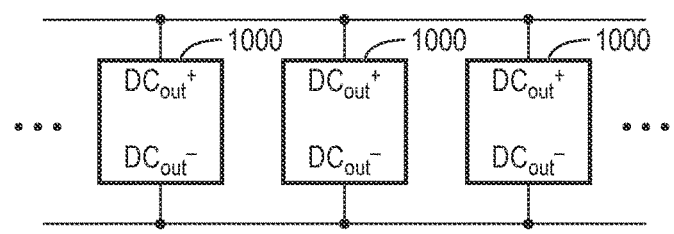
FIG. 11A shows a multitude of rectifying circuits coupled to one another in parallel to increase the rectified output current, in accordance with one embodiment of the present invention.

Embodiments of the present invention may be used to form both series and parallel combinations of a multitude of rectifying circuits. FIG. 11A shows a multitude of rectifying circuits 1000, in accordance with any of the embodiments described above, that are coupled to one another in parallel to increase the output current. Rectifying circuit 1000 may correspond to any one of the rectifying circuits shown in FIGS. 3-6 and described above. If one of the rectifying circuits 1000 receives or generates less power, the voltage/current generated by that rectifying circuit would drop, in turn resulting in power drainage supplied by other antennas to that rectifying circuit. To overcome this problem, in accordance with one embodiment, gate driver circuit 250 shown in FIGS. 3-6 dynamically and adaptively lowers the biasing voltage it supplies to the N-channel transistors, e.g. N-channel transistors 108 of FIG. 3, N-channel transistors 210, 220 of FIGS. 4 and 5, or N-channel transistor 402. Under some conditions, the gate driver circuit may cause the transistor(s) to turn off.

Figure 11B:
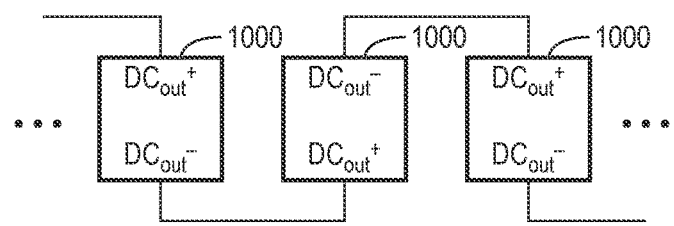
FIG. 11B shows a multitude of rectifying circuits coupled to one another in series to increase the rectified output voltage, in accordance with another embodiment of the present invention.

FIG. 11B shows a multitude of rectifying circuits 1000, in accordance with any of the embodiments described above, that are coupled to one another in series to increase the output voltage. Rectifying circuit 1000 may correspond to any one of the rectifying circuits shown in FIGS. 3-6 and described above. To overcome power drainage by any one of the rectifying circuits, in accordance with one embodiment, gate driver circuit 250 shown in FIGS. 3-6 dynamically and adaptively increases the biasing voltage it supplies to the NMOS transistor(s) disposed in the rectifying circuit(s).

The above embodiments of the present invention are illustrative and not limitative. Embodiments of the present invention are not limited by any RF frequency or any type of antenna, such as dipole, loop, patch, horn or otherwise, used to receive the RF signal. Embodiments of the present invention are not limited by the impedance matching network, the RF blocking circuit, by the polarization direction, such as linear, circular, elliptical or otherwise, of the RF signals received by the antennas. Furthermore, in some embodiments, the transmitted RF signal may be of varying polarization. Other additions, subtractions or modifications are obvious in view of the present disclosure and are intended to fall within the scope of the appended claims.

What is claimed is:

1. A rectifying circuit adapted to rectify an RF signal supplied by an antenna receiving electromagnetic waves, the rectifying circuit comprising:
   a first NMOS transistor having a source terminal receiving a ground potential and a gate terminal receiving a biasing voltage;
   a second NMOS transistor having a gate terminal coupled to the drain terminal of the first NMOS transistor, a drain terminal coupled to the gate terminal of the first NMOS transistor, and a source terminal receiving the ground potential;
   an impedance matching network disposed between the antenna and the drain terminals of the first and second NMOS transistors;
   an RF block circuit coupled between the drain terminals of the first and second NMOS transistors and an output terminal of the rectifying circuit, said RF block circuit adapted to block the RF signal from arriving at the output terminal of the rectifying circuit;
   a first capacitive element disposed between the gate terminal of the first NMOS transistor and the drain terminal of the second NMOS transistor; and
   a second capacitive element disposed between the gate terminal of the second NMOS transistor and the drain terminal of the first NMOS transistor.

2. The rectifying circuit of claim 1 wherein said impedance matching network comprises a first inductive element coupled between the output terminal and the drain terminal of the first NMOS transistor, and a second inductive element coupled between the output terminal and the drain terminal of the second NMOS transistor.

3. The rectifying circuit of claim 2 wherein said RF block circuit comprises a capacitive element disposed between the output terminal and a ground terminal supplying the ground potential.

4. The rectifying circuit of claim 1 further comprising:
   a biasing circuit supplying the biasing voltage to the gate terminals of the first and second NMOS transistors.

5. The rectifying circuit of claim 4 wherein said biasing circuit is a battery.

6. The rectifying circuit of claim 4 wherein said biasing circuit supplies the biasing voltage in response to an output voltage the biasing circuit senses at the output terminal.

7. The rectifying circuit of claim 4 wherein said rectifying circuit further comprises:
   a first resistive element disposed between the biasing circuit and the gate terminal of the first NMOS transistor; and
   a second resistive element disposed between the biasing circuit and the gate terminal of the second NMOS transistor.

8. The rectifying circuit of claim 1 wherein said first and second NMOS transistors are enhancement mode transistors.

9. The rectifying circuit of claim 1 wherein said first and second NMOS transistors are depletion mode transistors.

10. The rectifying circuit of claim 1 wherein said RF signal is applied between the drain terminals of the first and second NMOS transistors.

11. The rectifying circuit of claim 1 wherein said RF signal is applied between the drain terminal of the first NMOS transistor and a ground terminal supplying the ground potential.

12. The rectifying circuit of claim 4 wherein said rectifying circuit further comprises:
   a first inductive element disposed between the biasing circuit and the gate terminal of the first NMOS transistor; and
   a second inductive element disposed between the biasing circuit and the gate terminal of the second NMOS transistor.

13. A rectifying circuit adapted to rectify an RF signal supplied by an antenna receiving electromagnetic waves, the rectifying circuit comprising:

an NMOS transistor having a source terminal receiving a ground potential;

an impedance matching network disposed between the antenna and the drain terminal of the NMOS transistor;

an RF block circuit coupled between the drain terminal of the NMOS transistor and an output terminal of the rectifying circuit, said RF block circuit adapted to block the RF signal from arriving at the output terminal of the rectifying circuit; and a gate driver circuit driving a gate terminal of the NMOS transistor in response to an output voltage present at the output terminal of the rectifying circuit.

14. The rectifying circuit of claim 13 wherein said impedance matching network comprises a portion of a transformer having a first output terminal coupled to the drain terminal of the NMOS transistor and a second output terminal coupled to the gate terminal of the NMOS transistor, said first and second output terminals of the transformer supplying signals that are 180° out-of-phase with respect to one another.

15. The rectifying circuit of claim 14 wherein said RF block circuit comprises:

an inductive element disposed between the drain terminal of the NMOS transistor and the output terminal; and a capacitive element disposed between the output terminal and a ground terminal supplying the ground potential.

16. The rectifying circuit of claim 14 wherein said gate driver circuit drives the gate terminal of the NMOS transistor via a second input terminal of the transformer.

17. A method of rectifying an RF signal delivered by an antenna, said antenna delivering the RF signal in response to electromagnetic waves incident thereon, the method comprising:

applying a biasing voltage to a gate terminal of a first NMOS transistor having a source terminal receiving a ground potential;

applying the biasing voltage to a gate terminal of a second NMOS transistor having a gate terminal coupled to the drain terminal of the first NMOS transistor, a drain terminal coupled to the gate terminal of the first NMOS transistor, and a source terminal receiving the ground potential;

matching an impedance of the antenna to an impedance of the drain terminals of the first and second NMOS transistor; and blocking the RF signal from arriving at an output terminal carrying the rectified signal.

18. The method of claim 17 further comprising:
applying the biasing voltage to the gate terminal of the first NMOS transistor via a first capacitive element; and
applying the biasing voltage to the gate terminal of the second NMOS transistor via a second capacitive element.

19. The method of claim 17 wherein said impedance matching comprises matching the impedance via a first inductive element coupled between the output terminal and the drain terminal of the first NMOS transistor, and a second inductive element coupled between the output terminal and the drain terminal of the second NMOS transistor.

20. The method of claim 19 wherein said blocking of the RF signal comprises blocking of the RF signal via a capacitive element disposed between the output terminal and a ground terminal supplying the ground potential.

21. The method of claim 17 further comprising:
supplying the biasing voltage via a battery.

22. The method of claim 17 further comprising:
supplying the biasing voltage in response to a voltage present at the output terminal.

23. The method of claim 17 further comprising:
supplying the biasing voltage to the gate terminal of the first NMOS transistor via a first resistive element; and
supplying the biasing voltage to the gate terminal of the second NMOS transistor via a second resistive element.

24. The method of claim 17 wherein said first and second NMOS transistors are enhancement mode transistors.

25. The method of claim 17 wherein said first and second NMOS transistors are depletion mode transistors.

26. The method of claim 17 further comprising:
applying the RF signal between the drain terminals of the first and second NMOS transistors.

27. The method of claim 17 further comprising:
applying the RF signal between the drain terminal of the first transistor NMOS transistor and a ground terminal supplying the ground potential.

28. The method of claim 17 further comprising:
supplying the biasing voltage to the gate terminal of the first NMOS transistor via a first inductive element; and
supplying the biasing voltage to the gate terminal of the second NMOS transistor via a second inductive element.

29. A method of rectifying an RF signal delivered by an antenna, said antenna delivering the RF signal in response to electromagnetic waves incident thereon, the method comprising:

driving a gate terminal of an NMOS transistor in response to the rectified signal;

applying a ground potential to a source terminal of the NMOS transistor;

matching an impedance of the antenna to an impedance of the drain terminal of the NMOS transistor;

blocking the RF signal from arriving at an output terminal carrying the rectified signal; and matching the impedance of the antenna and the drain terminal of the NMOS transistor via a matching network comprising a portion of a transformer having a first output terminal coupled to the drain terminal of the NMOS transistor and a second output terminal coupled to the gate terminal of the NMOS transistor, said first and second output terminals of the transformer supplying signals that are 180° out-of-phase with respect to one another.

30. The method of claim 29 further comprising:
blocking the RF signal via an inductive element disposed between the drain terminal of the first NMOS transistor and the output terminal, and a capacitive element disposed between the output terminal and a ground terminal supplying the ground potential.

31. The method of claim 29 further comprising:
driving the gate terminal of the NMOS transistor via a second input terminal of the transformer.

* * * * *